(12) United States Patent
Baril et al.

(10) Patent No.: US 11,717,953 B2
(45) Date of Patent: Aug. 8, 2023

(54) HARVESTING BENCH

(71) Applicants: HYDROTEK HYDROPONICS, Mirabel (CA); LARIN DESIGN, Blainville (CA)

(72) Inventors: Sebastien Baril, Morin-Heights (CA); Dominic Larin, Blainville (CA)

(73) Assignees: HYDROTEK HYDROPONICS, Mirabel (CA); LARIN DESIGN, Blainville (CA)

( * ) Notice: Subject to any disclaimer, the term of this patent is extended or adjusted under 35 U.S.C. 154(b) by 186 days.

(21) Appl. No.: 17/346,514

(22) Filed: Jun. 14, 2021

(65) Prior Publication Data
US 2021/0387322 A1 Dec. 16, 2021

Related U.S. Application Data

(60) Provisional application No. 63/039,079, filed on Jun. 15, 2020.

(51) Int. Cl.
*B25H 1/16* (2006.01)
*B25H 1/02* (2006.01)

(52) U.S. Cl.
CPC ............... *B25H 1/16* (2013.01); *B25H 1/02* (2013.01)

(58) Field of Classification Search
CPC .... B25H 1/02; B25H 1/16; A47B 1/08; A01G 9/1423
See application file for complete search history.

(56) References Cited

U.S. PATENT DOCUMENTS

| | | | |
|---|---|---|---|
| 1,876,571 A | 9/1932 | Conley | |
| 3,515,077 A * | 6/1970 | Glowacki | A47B 1/08 108/89 |
| 4,781,127 A | 11/1988 | Conley | |
| 2014/0083005 A1 | 3/2014 | Collins | |
| 2014/0290132 A1 | 10/2014 | Bent | |
| 2022/0287450 A1 * | 9/2022 | Benard | A47B 1/10 |

FOREIGN PATENT DOCUMENTS

| | | | |
|---|---|---|---|
| DE | 202007012099 U1 * | 2/2009 | ............... A47B 1/08 |
| DE | 202009016056 | 10/2010 | |
| JP | 2010088344 | 4/2010 | |
| KR | 101090776 B1 * | 12/2011 | |

* cited by examiner

*Primary Examiner* — Matthew W Ing
(74) *Attorney, Agent, or Firm* — Norton Rose Fulbright Canada LLP

(57) ABSTRACT

A modular harvesting bench is provided. The bench comprises a frame for contacting the ground surface, a platform supported by the frame at an elevation above the ground surface, the platform defining a work plane area for receiving harvesting equipment. A portion of the frame and of the platform define parts of a first bench section movable relative to a second bench section between a retracted position and an extended position to extend or retract a footprint of the bench and/or extend or reduce the work plane area.

20 Claims, 7 Drawing Sheets

FIG. 5

HARVESTING BENCH

CROSS-REFERENCE TO RELATED APPLICATION

The present application claims priority on U.S. Provisional Patent Application No. 63/039,079, filed on Jun. 15, 2020, the entire content of which is incorporated by reference herein.

TECHNICAL FIELD

The application relates generally to harvesting facilities and, more particularly, to indoor harvesting equipment.

BACKGROUND OF THE ART

Harvesting facilities are growing larger over time as production scales up. The available space inside these installations is a major determinant to profitability per square foot of indoor harvesting facilities, where space may be a precious asset. As the production scales up, the installations requirements may evolve and the equipment may become unsuitable to accommodate larger production when production outgrows capacity. Working with equipment unsuitable for their purposes may limit productivity and/or increase work injury, and/or result in uncomfortable working environment for the workers.

SUMMARY

In one aspect, there is provided a harvesting bench configured to stand on a ground surface, comprising a frame for contacting the ground surface, a platform supported by the frame at an elevation above the ground surface, the platform defining a work plane area for receiving harvesting equipment, a portion of the frame and the platform defining parts of a first bench section movable relative to a second bench section between a retracted position and an extended position to extend or retract a footprint of the bench and/or extend or reduce the work plane area.

DESCRIPTION OF THE DRAWINGS

Reference is now made to the accompanying figures in which.

DETAILED DESCRIPTION

Indoor harvesting facilities may be used to cultivate various plants, whether to produce food products, pharmaceutical ingredients and/or consumables. Such facilities may be adapted to suit best for certain types of crops. Workers in indoor harvesting facilities may often be required to adopt uncomfortable work positions for extended period of time while doing their tasks to take care of the crops. Tables, racks and/or benches providing a working plane at an elevation above the ground may facilitate harvesting and reduce the risk for injuries, such as back and/or knees injuries.

As the production scales up, harvesting facilities may require to optimize their harvesting spaces to reach better productivity. Harvesters may require to "create" more indoor space where space is already limited. Non-permanent installations and/or scalable installations may be more versatile and adapt more easily to the fast pace scale up of the productions as the needs evolve.

Figure 1:
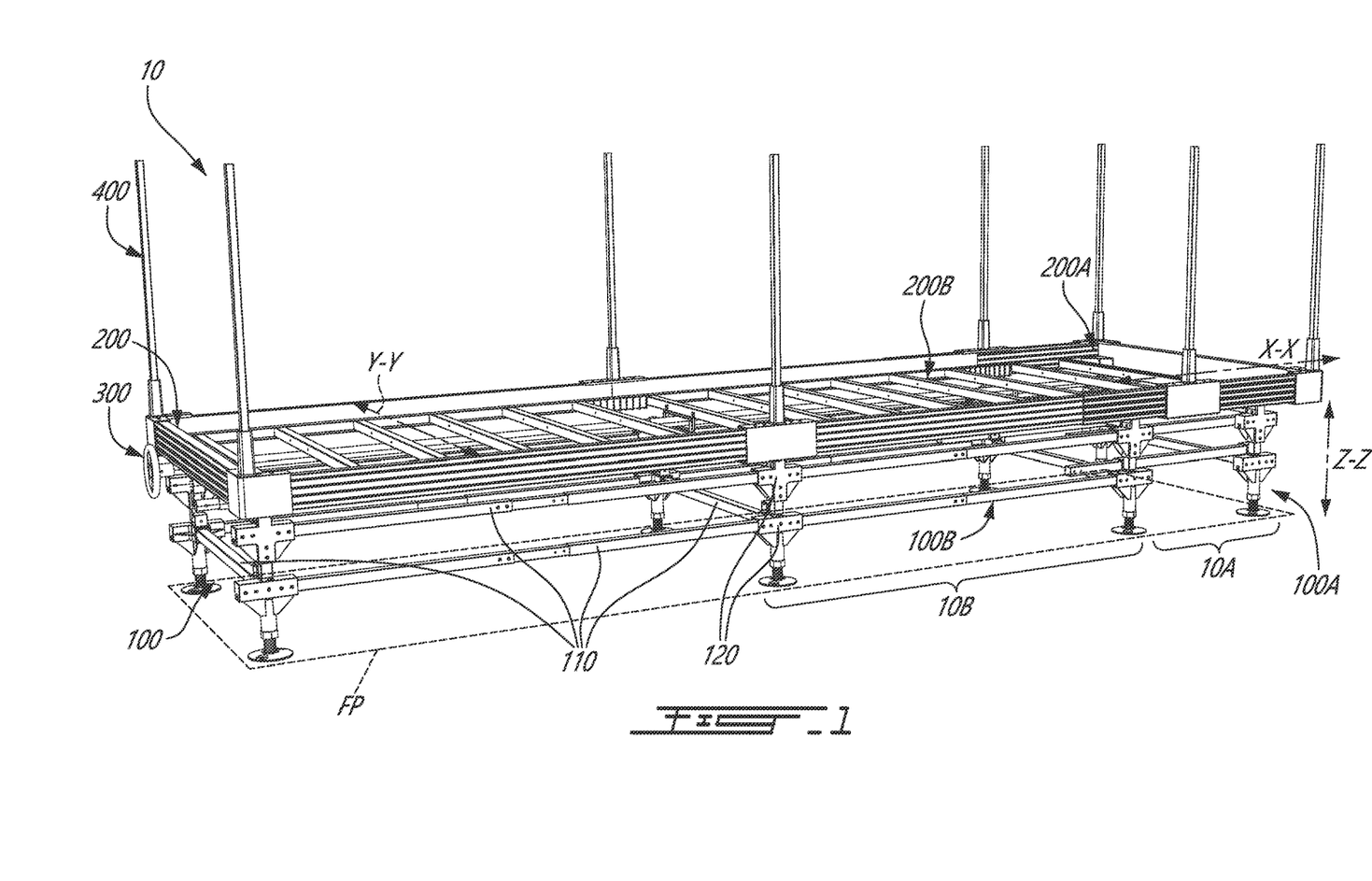
FIG. 1 is a perspective view of a harvesting bench, according to an embodiment.

Referring to FIG. 1, a harvesting bench 10, which may also be referred to as a harvesting table, is shown. Such bench 10 may be installed in various types of harvesting facilities. For instance, the bench 10 may be installed in hydroponic growing rooms. Harvesting facilities having benches 10 with elevated work plane may prevent or limit environmental issues, such as lack of air circulation and humidity build up in areas packed with plants.

The bench 10 includes a frame 100 for contacting the ground, and a platform 200 supported by the frame 100 at an elevation above the ground. The platform 200 defines a work plane, which may be horizontal (or substantially horizontal) relative to its surrounding environment. The platform may support harvesting equipment, such as trays, flood tables, and/or reservoirs. For instance, the platform 200 may be sized and/or dimensioned to fit with specifics trays, such as those commercialized under the name XTRAYS™. The bench 10 includes a rolling system 300 interfacing with the frame 100 and the platform 200. The rolling system 300 allows lateral displacement along axis Y-Y of the platform 200 on the frame 100 while the frame 100 remains still relative to the ground. While the rolling system 300 may facilitate adaptability and improve versatility of the bench 10 according to the available space and/or facilitate handling of the platform 200 by a worker, the rolling system 300 is optional in some embodiments. In some embodiments, such as shown, the bench 10 further includes a trellis netting support assembly 400. The assembly 400 may be used to suspend harvesting equipment, for example hoses, nets, lights, etc., and/or used as tutors for plants. The assembly may be removable so as to adapt the bench 10 to an instant use not requiring it, hence save space heighwise, for instance.

The bench 10 is modular. The bench includes at least one bench section 10A that is extendable longitudinally along axis X-X relative to a remainder of the bench 10 and/or an adjacent section 10B thereof to adjust a footprint FP of the bench 10. The footprint FP is defined as the area occupied by the bench 10 in its surrounding environment. In the depicted embodiment, the bench section 10A forms part of an end of the bench 10 and may extend or retract along axis X-X relative to the adjacent section 10B of the bench 10. The bench section 10A includes a portion 100A of the frame 100 and a portion 200A of the platform 200 of the bench 10. The portion 100A of the frame 100 and the portion 200A of the platform 200, which form part of the bench section 10A, may slidingly or otherwise translationally engage adjacent portions of the frame 100 and the platform 200, such that the footprint FP of the bench 10 may be increased or reduced, at least longitudinally.

The modularity of the bench 10 may provide versatility as the dimensions and geometry of the bench 10 may be adapted to custom needs and space. For instance, a worker (or other users of the bench 10) may add or remove modules (modules or "section") of the bench 10 over time to adapt to evolving needs of the harvesting facility, for instance a modification to the facility layout, a setting of a non-permanent (temporary) installation, for instance adapted to a specific crop for a short period of time, etc.

The modularity of the bench 10 may also facilitate on-site assembly of the bench 10. For instance, the bench 10 may be provided as a kit with or without assembly instructions. A user may then assemble the bench 10 using the components of the kit forming at least part of the frame 100, platform 200, rolling system 300 and/or trellis netting support assembly 400, and fit the bench dimensions and geometry to a suitable setting. In some embodiments, the bench 10 may be assembled without tools because of the configuration of the components (ready-to-assemble) thereof, for instance.

The features of the frame 100, platform 200, rolling system 300 and trellis netting support assembly 400 will now be described.

The frame 100 includes a plurality of armature members 110 forming parts of the skeleton of the frame 100. Some of these armature members 110 extend longitudinally along axis X-X on opposite sides of the bench 10. Some other armature members 110 extend transversely along axis Y-Y of the bench 10. Yet some other armature members 110 extend along axis Z-Z in a heightwise direction of the bench 10.

The frame 100 includes a plurality of armature connectors 120 configured to interconnect the armature members 110 together. The armature connectors 120 form joints at junctions between at least two armature members 110. In addition to interconnecting the armature members 110 together, some armature connectors 120 are configured to contact the floor to support the bench 10 thereon, while some other armature connectors 120 are located at an elevation above the floor, above those connectors 120 configured to contact the floor.

Figure 2:
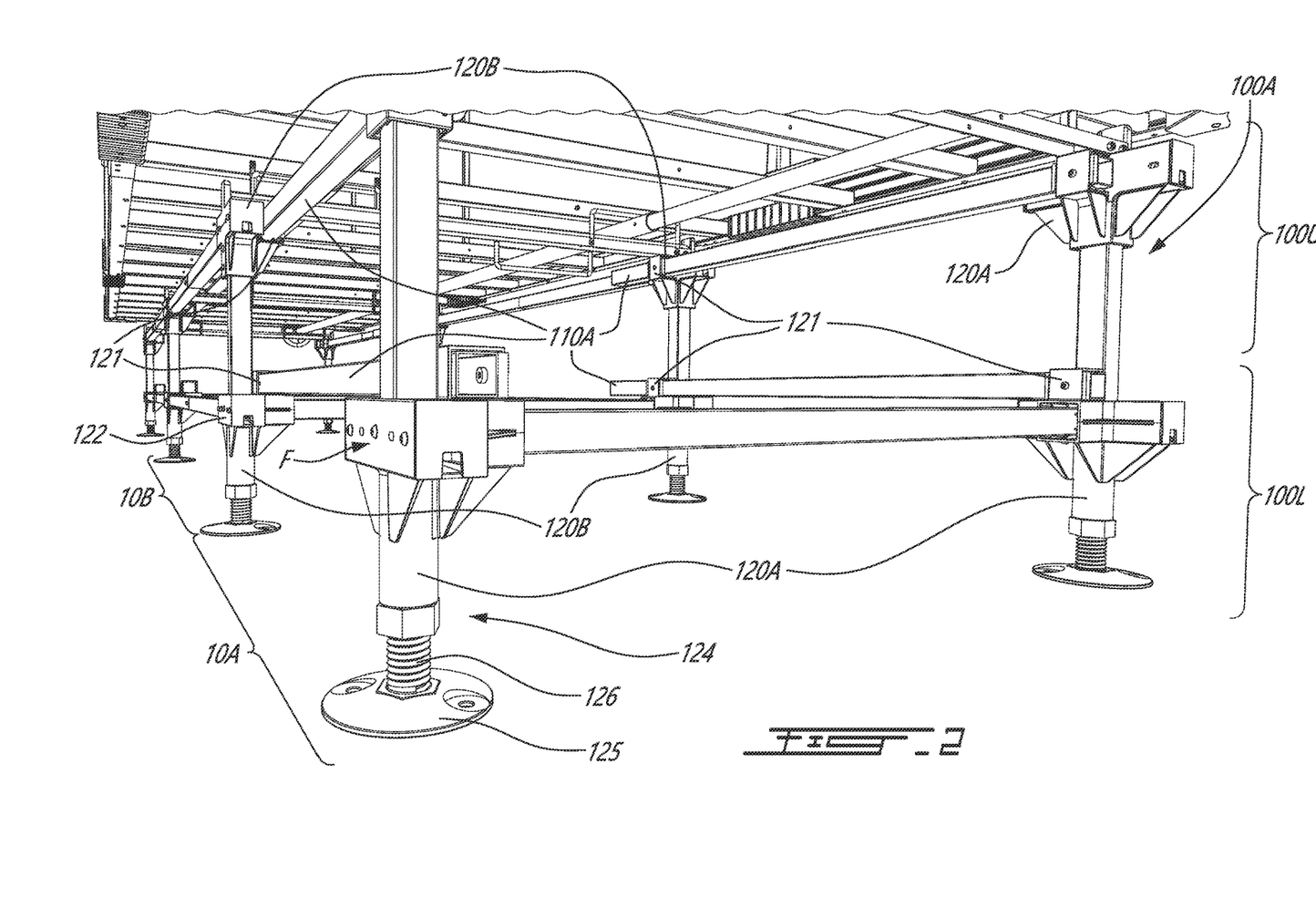
FIG. 2 is a magnified perspective view of the harvesting bench of FIG. 1, viewed from below and showing features of a frame thereof.

Referring to FIG. 2, the portion 100A of the frame 100 forming part of the extendable bench section 10A is shown. The bench section 10A includes a plurality of armature member connectors 120A, here shown as two pairs of vertically spaced-apart connectors 120A, secured to respective longitudinally extending armature members 110A slidingly received in coupling portions 121 of the vertically spaced-apart connectors 120B from the adjacent bench section 10B. This may be reversed in other embodiments. As shown, such coupling portion 121 is annular. In the depicted embodiment, the coupling portion 121 includes an annular wall, which may also be referred to as an annular bracket. The coupling portion 121 defines a through hole 1210 having openings at opposite ends thereof through which the longitudinally extending armature members 110A may slide. In the depicted embodiment, the through hole 1210 has a cross-sectional shape which is squared (shown with rounded edges). The annular wall may have other cross-sectional shape (e.g. round, oval, trapezoidal, polygonal, or irregular) to accommodate a corresponding shape of the armature members 110A received therein, for instance. As shown, the though hole 1210 has a hole axis or orientation along the longitudinal axis of the bench 10, more specifically, in this case, parallel thereto. Other coupling portion 121 geometries may be contemplated. Cooperation between the coupling portion 121 and an armature member 110A may be made differently. For instance, the coupling portion 121 may be partially annular or not annular at all and still configured to cooperate with an armature member 110A for relative movement therebetween. The coupling portion 121 may allow axial engagement with an armature member 110 without such annular wall, and without such through hole 1210 in at least some other embodiments.

Connectors 120, here identified as pair of connectors 120A, 120B, are located in a lower level 100L and in an upper level 100U of the frame 100. The lower and upper levels 100L, 100U are named in function of their relative position. Such lower and upper levels 100L, 100U may be referred to as lower level frame portion and upper level frame portion, which define the frame 100. The lower and upper levels 100L, 100U define two levels located at a relative elevation from each other, with the lower level 100L including features closer from the floor (floor or ground), like some connectors interfacing with the floor or ground surface, and the upper level 100U including features interfacing with the platform 200 and/or the rolling system 300 of the bench 10. As discussed later, the legs of the frame 100 that link the lower and upper levels 100L, 100U can be considered as part of the lower level 100L or the upper portion 100U. In other embodiments, the bench 10 may be adapted to have only one level or more than two levels.

In the depicted embodiment, the pairs of connectors 120A from the first bench section 10A can move toward and away the pairs of connectors 120B of the second bench section 10B while receiving the longitudinally extending armature members 110A therein before such longitudinally extending armature members 110A are secured in place (via fasteners F or other fixing means, such as clips, quick connects, dowel pins, bolts, screws, etc.) to the pairs of connectors 120B of the second bench section 10B. The longitudinally extending armature members 110A may thus slide against the coupling portions 121 of the pairs of connectors 120B of the second bench section 10B when the first bench section 10A is being extended and/or retracted. While the term "slide" is used herein, the extending armature members may move, in linear motion, relative to the connectors in other manners. For instance, linear motion could be performed using rolling supports (e.g. bearings, such as linear bearings, cylindrical rollers, etc.). While referring to pairs of connectors 120A, 120B, this is not limitative as a said pair of connectors 120A, 120B may be made as a single piece, or there may be more than two connectors (e.g. three, four, etc.) in the grouping of connectors (e.g. three vertically-spaced apart connectors in a same column).

As shown, the longitudinally extending armature members 110A of the extendable bench section 10A extend longitudinally beyond the coupling portions 121 of the adjacent bench section 10B with which they connect. The extendable bench section 10A is shown in a partially extended/retracted position. In the depicted embodiment, the extendable bench section 10A could be extended to full extension position, where both ends of the armature members 110A engaged in their respective coupling portions 121 of the adjacent bench section 10B may be flush with the coupling portions 121 of each one of the bench sections 10A, 10B. There could also be a number of partial extended position (e.g. 50%, 60%, 70%, 80% extended) between a fully retracted position and a fully extended position, as the extent of the extension may be adjusted as desired, depending on the required or available space for cultivating, for instance.

In the depicted embodiment, all of the connectors 120 have such coupling portion 121. As such, during assembly of the bench 10, the connectors 120A, 120B of the lower level 100L may be interchangeable (likewise for those of the upper level 100U). Such interchangeability of the connectors may facilitate assembly of the bench 10, allow easier reconfiguration of the bench 10 and/or reduce manufacturing costs per bench 10. In the depicted embodiment, each connector 120 has a single coupling portion 121. There may be more (e.g. two . . . ) in other embodiments. Having more than one coupling portion 121 may provide even more flexibility in the interchangeability of connectors and modularity of the bench 10, for instance to assemble adjacent movable bench sections, such as a plurality of extentable bench sections 10A. connected one to another.

In other embodiments, there may be more or less than two pairs of connectors 120A of the extendable bench section 10A and two pairs of connectors 120B of the adjacent bench section 10B, depending on the configuration and/or number of longitudinally extending armature members and connectors of the frame 100.

Figure 3:
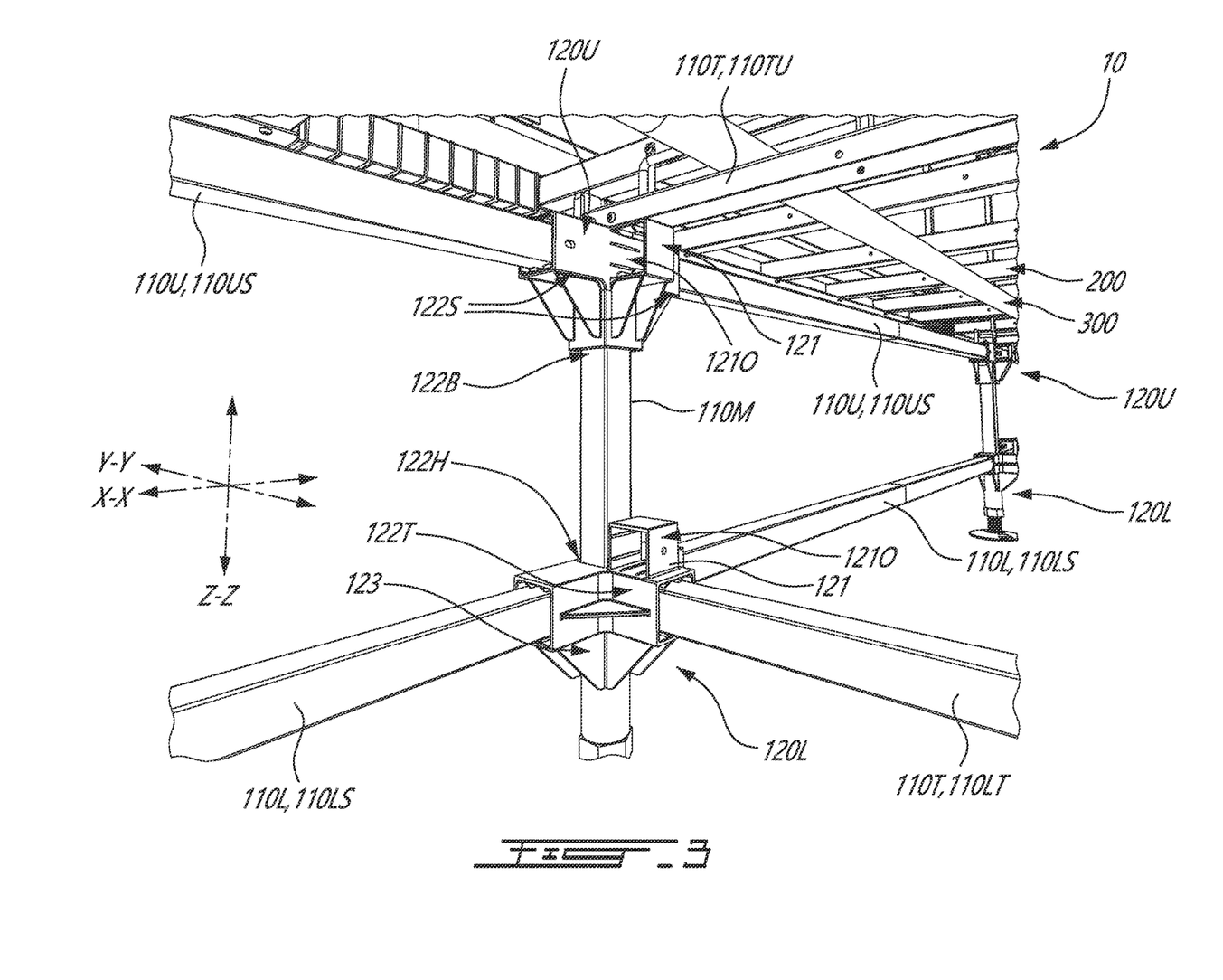
FIG. 3 is another magnified perspective view of features of the frame of the harvesting bench shown in FIGS. 1-2.

As just mentioned, and now referring to FIG. 3, the frame 100 includes armature connectors in both the lower and upper levels 100L, 100U. For convenience, in FIG. 3, armature connectors of the lower level 100L will be referred to as the lower connectors 120L and armature connectors of the upper level 100U will be referred to as the upper connectors 120U. As shown, the lower connectors 120L are adapted to contact the floor (floor or ground), while the upper connectors 120U are adapted to interface with the platform 200 and/or the rolling system 300.

Similarly, the frame 100 includes armature members in both the lower and upper levels 100L, 100U. For convenience, in FIG. 3, armature members of the lower level 100L will be referred to as the lower armature members 110L and armature members of the upper level 100U will be referred to as the upper armature members 110U. In the depicted embodiment, the frame 100 includes armature members extending between the lower and upper connectors 120L, 120U. For convenience, in FIG. 3, such armature will be referred to as the middle armature members 110M (or "legs"). It may be contemplated to have the lower and upper connectors 120L, 120U and the middle armature members 110M formed as a single piece in some embodiments. For instance, a middle armature member 110M, a lower connector 120L and an upper connector 120U could be formed as a one piece structure. This may reduce the number of separate parts.

With reference to what is shown in FIG. 3, some of the lower armature members 110L extend longitudinally along axis X-X of the bench 10. These armature members may be referred to as the lower armature side members 110LS. Likewise, some of the upper armature members 110U extend longitudinally along axis X-X of the bench 10. These armature members may be referred to as the upper armature side members 110US. The lower and upper armature side members 110LS, 110US connect to side coupling portions 122S of lower and upper connectors 120L, 120U. Such side coupling portions 122S each connect to a respective end of lower or upper armature side members 110LS, 110US disposed end-to-end or coaxial. The side coupling portions 122S of the lower and upper connectors 120L, 120U, may define a junction with a common junction axis along which two adjacent lower or upper armature side members 110LS, 110US are aligned when they are connected to the connector 120L, 120U. In other words, the side coupling portions 122S are coaxial one with respect to the other. As discussed above, the lower and upper armature side members 110LS, 110US may engage the coupling portions 121 instead of the side coupling portions 122S, where it is intended to have movable armature side members 110LS, 110US as discussed above with respect to the extendable bench section 10A.

In the depicted embodiment, the through hole 1210 orientation of the coupling portions 121 is aligned (parallel) with the common junction axis of the side coupling portions 122S. As shown, the coupling portions 121 are located upward (higher than, along axis Z-Z) and inward (toward the center of the bench 10 along axis Y-Y) relative to the side coupling portions 122S. As seen in FIG. 3, the middle armature members 110M and the armature side members 110LS, 110US are coplanar, with the common junction axis contained in a same plane as a central axis (in the Z-Z direction) of the middle armature members 110M. The through hole 1210 of the coupling portions 121 extend along an axis or orientation parallel to such plane. The linear motion of the armature members 110A engaged in the coupling portions may thus not interfere with the middle armature members 110M, but still parallel to the common junction axis discussed above. The relative location of the coupling portions 121 and the side coupling portions 122S may be different in other embodiments, (e.g. downward and/or outward, as opposed to that discussed above).

Some of the lower armature members 110L may extend transversely along axis Y-Y of the bench 10. These armature members may be referred to as the lower armature cross-members 110LT. The lower cross-members 110LT connect to transverse coupling portions 122T of a pair of lower armature connectors 120L located on opposite sides of the bench 10. The transverse coupling portions 122T connect to respective ends of armature cross-members 110LT of the lower level 100L, The lower cross-members 110LT may be desirable for some embodiments, as they may provide more robustness and/or rigidity to the frame 100 and/or contribute to the structural integrity of the frame 100 when the bench 10 is loaded. In some embodiments, such cross-members could be absent, for instance where less robustness transversely may be contemplated.

Likewise, some of the upper armature members 110U may extend transversely along axis Y-Y of the bench 10. These armature members may be referred to as the upper armature cross-members 110UT. The upper armature cross-members 110UT may interact with the rolling system 300 (if present), as will be discussed later. In the depicted embodiment, the upper cross-members 110UT connect to a pair of upper armature connectors 120U located on opposite sides of the bench 10, via fasteners F or other fixing means. The upper armature connectors 120U do not have the transverse coupling portion 122T discussed above. In other embodiment, at least some or all of the upper connectors 120U may have such transverse coupling portion 122T to connect with upper armature cross-members 110UT.

The number of cross-members 110LT, 110UT may vary depending on the embodiments.

In the depicted embodiment, the lower and upper armature cross-members 110LT, 110UT connect to adjacent connectors from a same level of the frame (lower level 100L or upper level 100U). In other embodiments, at least one of the armature cross-members 110LT may connect to connectors from different levels of the frame 100 (e.g. one end of an armature cross-member connected to a lower connector 120L and another end of such armature cross-member connected to an upper connector 120U) such as to extend obliquely from one side of the bench 10 to the other.

In the depicted embodiment, the middle armature members 110M connect to a head coupling portion 122H of lower connectors 120L and to a bottom coupling portion 122B of the upper connectors 120U. The head coupling portion 122H and the bottom coupling portion 122B connect to respective opposite ends of the middle members 110M (leg). As shown, the head coupling portion 122H of lower connectors 120L and the bottom coupling portion 122B of the upper connectors 120U are coaxial so as to receive respective opposite ends of the middle members 110M, which are straight legs at least in the depicted embodiment.

In some embodiments, such as shown, the transverse coupling portions 122T, side coupling portions 122S are perpendicular with respect to the head coupling portion 122H and/or bottom coupling portion 122B. The side coupling portions 122S and the head coupling portion 122H or bottom coupling portion 122B may define a "T-shape" junction, as can be seen generally at FIGS. 2-3. This may facilitate interchangeability between the connectors of one or the other sides of the bench 10, which may contribute to greater versatility during assembly.

In the depicted embodiment, as shown in FIGS. 2-3, the upper armature cross-members 110UT are strut channels ("C", "U" channel, etc.). This may save even more weight of the frame 100. The other armature members, namely the lower and upper armature side members 110LS, 110US, the lower armature cross-members 110LT, and the armature middle members 110M are hollow tubes. This may allow for a lighter structure compared to plain bars. The tubes have a square cross-section. Other cross-sections may be contemplated in other embodiments. For instance, the tubes may have a rectangular, round or circular cross-section, or have other extruded profile shapes (e.g. polygonal, oval, ribbed, irregular, etc.). In a particular embodiment, all of the armature members 110 are of the same type and cross-section. The armature members 110 may be plain bars in other embodiments.

In the depicted embodiment, some lower and upper armature side members 110LS, 110US are telescopic or otherwise extendable as opposed to being of fixed length. As best seen on FIG. 4, the armature side members 110LS, 110US extending longitudinally along axis X-X have concentric segments which may extend, linearly. This is one example of how telescopic can be. In some embodiments, such as shown, the extendable armature side members 100LS, 110US, if present, have concentric slidable segments which may be adjusted and secured to a fixed length via fasteners F (e.g. dowel pins and hole arrangement, clip, etc.). In the depicted embodiment, a pair of armature side members 110LS of the lower level 100L and a pair of armature side members 110US of the upper level 100U on opposite sides of the bench 10 are extendable longitudinally along axis X-X. The bench 10 may have more than two pairs of extendable armature side members 110LS, 110US in some embodiments. All of the side members 110LS, 110US may be extendable, or none of them, in some embodiments. As such, a distance between adjacent armature connectors 120, illustrated in FIG. 4 as distance D between adjacent lower connectors 120L on the same side of the bench 10, may be adjusted by extending or retracting the armature side members 110LS, 110US. A relative position of adjacent armature connectors 120 may thus be adjusted as desired without affecting the footprint FP of the bench 10, as opposed to what happens when the extendable bench section 10A is extended or retracted relative to the adjacent bench section 10B (discussed above).

For a same footprint FP of the bench 10, the frame 100 may have more or less connectors 120, and more or less armature members 110 to support the platform 200 above the floor. The configuration of the frame 100 may depend on the desired rigidity and/or the load that the bench 10 will have to support on the platform 200.

In other embodiments, in addition to or instead of having extendable armature side members 110LS, 110US, at least some armature cross-members 110LT, 110UT may be extendable to extend transversely the bench 10 along axis Y-Y, and to adjust the relative position between adjacent connectors 120 on opposite sides of the bench 10. Likewise, the middle armature members 110M may be extendable to allow a height adjustment of the platform 200 relative to the floor. Other mechanisms may be contemplated to adjust the height of the platform when desired in some embodiments. Yet, the bench 10 may be provided with sets of middle armature members 110M of having different length, which may be interchangeable to have the bench 10 at the desired baseline height. See the different height shown in FIG. 1 versus FIG. 2, for instance.

The armature members 110 may be made of aluminium or galvanized steel. These materials may be advantageous in that they are rust resistant and may help to meet sanitary requirements or standards. Other materials may be contemplated, such as composite materials such as fibre-reinforced composite materials, polymeric materials (e.g. plastic, etc.).

In the depicted embodiment, the coupling portions bearing the number 122 discussed above are female coupling to receive respective ends of an armature member 110, though this can be reversed (e.g. male coupling received in armature member hollowed ends) in other embodiments. The coupling portions 121 have a shape adapted to allow connection with respective ends of an armature member 110. In some embodiments, for instance as shown, the coupling portion is female coupling and has an internal shape corresponding to that of the outer periphery of the armature member 110, here shown as a square tube. Round tubes and/or circular coupling portions (female or male) may be contemplated in other embodiments, for instance, or other cross-sectional shapes as discussed herein. The shape of the coupling portions may be different than the outer peripheral shape of the armature members 110 in some embodiments.

In the depicted embodiments, at least some, here all, of the armature connectors 120, whether lower connectors 120L or upper connectors 120U, have reinforcing ribs 123 extending between at least some adjacent ones of the coupling portions 121. Such reinforcing ribs 123 may contribute to increasing rigidity of the connectors 120.

As discussed above, some armature connectors 120 are configured to contact a floor surface and support the bench 10 on the floor surface. The lower connectors 120L includes a foot portion 124 for contacting the floor surface. In the depicted embodiment, the foot portion 124 includes a pillar 125 with an enlarged bottom disc, which may improve stability. Such type of foot portion 124 may be well suited for stationary benches (i.e. benches that are intended to be immovable once installed). In the depicted embodiment, the foot portion 124 may allow height adjustment, which may be allow better horizontality of the bench on an uneven floor. In the depicted embodiment, height adjustment is achieved via a threaded rod 126 forming part of the foot portion 124 that may be screwed or unscrewed from the remainder of the foot portion 124 to adjust height by retracting or extending the foot portion 124, heightwise.

Although not shown, in other embodiments, the foot portion 124 may include a ball joint, for instance at a junction of the pillar 125 and the rod 126, which may allow better interface of the pillar 125 with the floor if the floor is uneven. The foot portion 124 may be different in other embodiments. For instance, the foot portion 124 may include a roller or a wheel, such that the bench 10 may be more easily displaceable. Such bench 10 may be referred to as a rolling bench.

In the depicted embodiment, the armature connectors 120 are made of composite materials. Materials suitable for molding, such as injection molded materials or materials for additive manufacturing techniques, such as 3D printing may be used. For instance, fibre-reinforced composite materials, such as fibre-reinforced thermoplastic materials (e.g. "Nylon"), fibre-reinforced Acrylonitrile Butadiene Styrene (ABS), or compositions of both, or other composite materials with reinforcement means embedded therein may be used for the armature connectors 120. While fibre-reinforced materials may provide greater rigidity to the molded piece and may be well suited for injection molding of rigid parts, other materials without fibre-reinforcements, i.e. with no reinforcements at all or other types of reinforcements means, may be contemplated in some embodiments. Moldable connectors 120 may reduce manufacturing costs while providing a robust connection. Connectors 120 could also be machined instead of or in addition to be molded in some embodiments.

Figure 4:
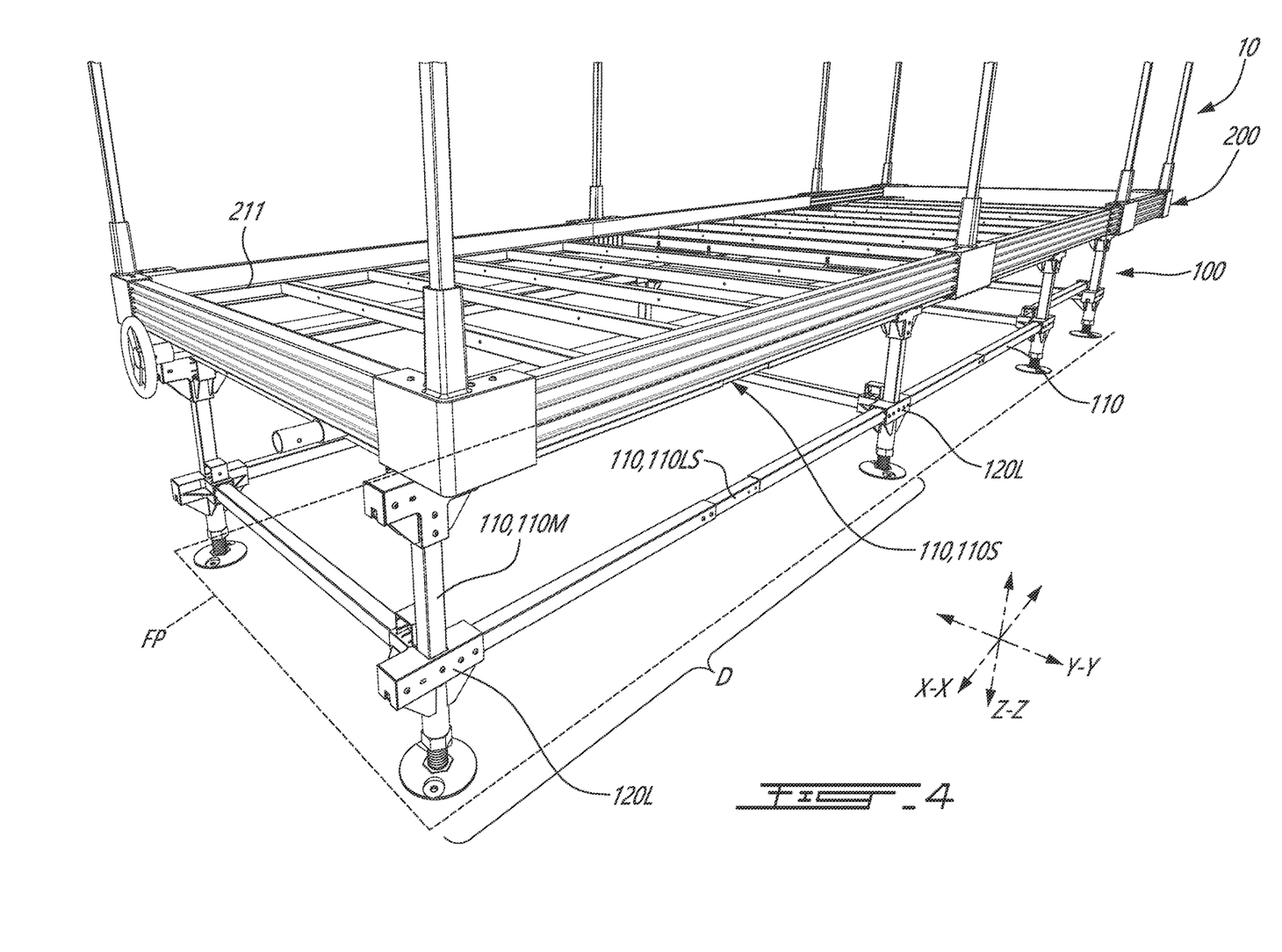
FIG. 4 is another perspective view of the harvesting bench of FIG. 1.
Figure 5:
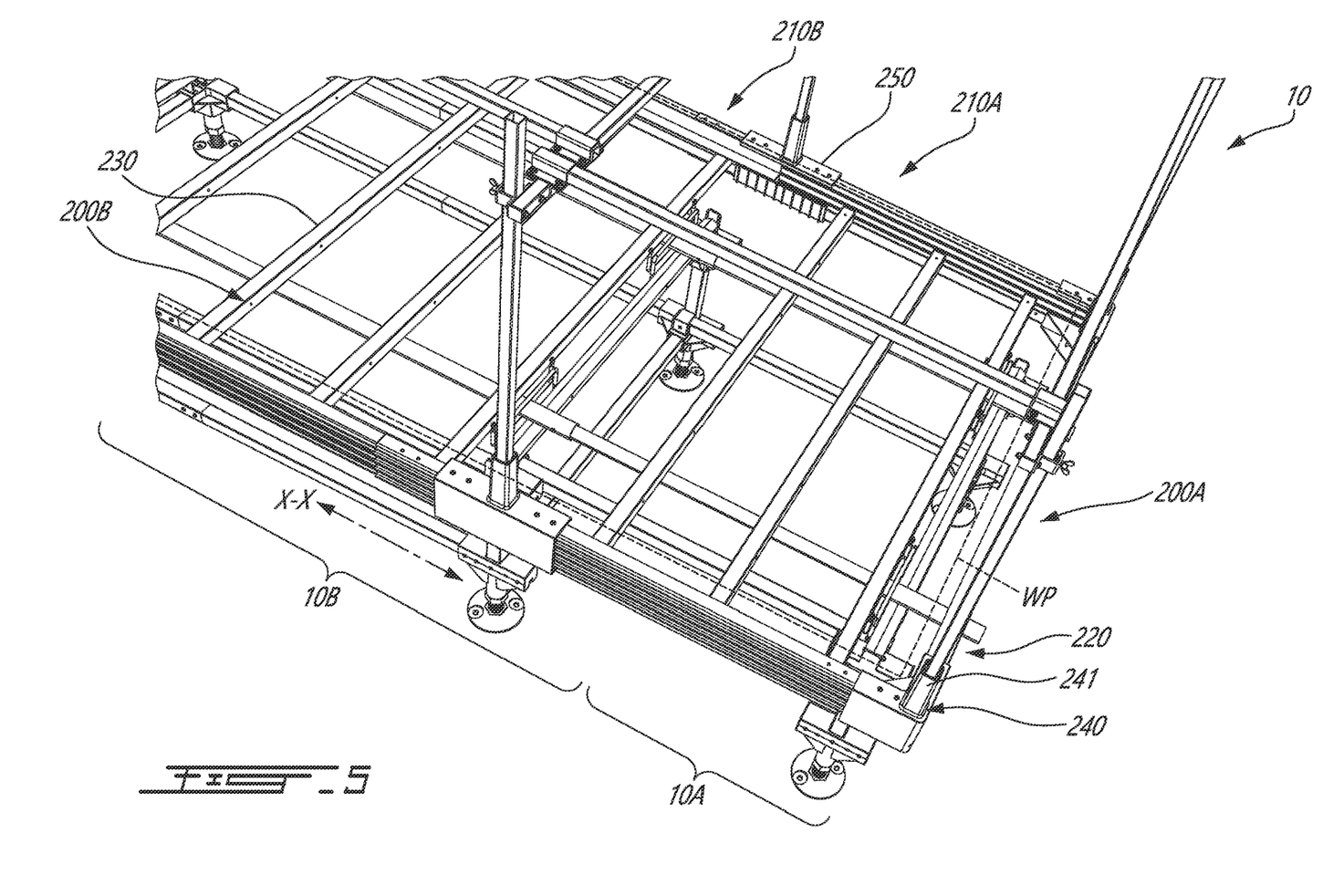
FIG. 5 is a perspective view of a section of the harvesting bench of FIGS. 1-4, viewed from above.

Referring to FIGS. 4-5, the platform 200 defines a work plane WP, which may be horizontal (or substantially horizontal) relative to the environment. The work plane WP may expand or retract (of greater or smaller area) as the bench section 10A extend or retract relative to the adjacent bench section 10B. The platform 200 has peripheral rails defining the periphery of the platform 200. The peripheral rails include side rails 210. The side rails form parts of a periphery of the work plane WP. As shown in FIG. 5, the portion 200A of the platform 200 forming part of the bench section 10A includes side rail segments 210A movable, slidable or otherwise in linear motion, relative to side rail segments 210B of the adjacent bench section 10B to allow extension or retraction of the portion 200A of the platform 200. In some embodiments, the side rail segments 210A, 210B may have a complementary shape. In some embodiments, such as shown, the side rails defines a high-profile channel such that one can engage the channel of the other one in a registering fashion. The side rails may have other suitable shape, for instance other shapes with slidably (or otherwise linearly movable) registering or interlocking features allows relative longitudinal motion along their length (or at least part thereof). The peripheral rails may provide a safer work plane WP, in that harvesting equipment may be surrounded by such rails and limit chutes of equipment during work.

In the depicted embodiment, the side rails 210 have one or more tabs 211 protruding inwardly toward the working plane WP. This is can be better seen in FIG. 4. The tabs 211 may form support surfaces to abut against peripheral portions of trays or other harvesting equipment laid on the platform 200, for instance. Side rails 210 without such tabs 211 may also be contemplated.

The platform 200 includes end rails 220, which may have the same configuration as that of the side rails 210. For instance, the end rails 220 can have the same shape, such as the high-profile channel discussed above. In some embodiments, the end rails 220 may be telescopic to retract or extend the platform 200 in the widthwise direction to expand or retract the work plane WP, although FIG. 4-5 show non-extendable end rails 220.

The platform 200 includes a plurality of cross-members 230, which may have the same configuration as the armature cross-members discussed above. For instance, the cross-member 230 of the platform 200 may be strut channel, tubes (e.g. square tubes), etc. The cross-members 230 are transverse reinforcements which interconnect opposite side rails 210. The cross-members 230 may also contact an undersurface of harvesting equipment such as trays laid on the work plane WP. The cross-members 230 may add rigidity and/or contribute to the structural integrity of the platform 200. The number of cross-members 230 may vary depending on the length of the platform 200, or rigidity requirements. The cross-members 230 may be more or less spaced apart depending on the embodiments. In other embodiments, the cross-members 230 may be absent, while other features may contribute to the structural integrity of the platform 200, for instance.

The platform 200 may include corner pieces 240 which may interconnect side rails 210 to end rails 220. In the depicted embodiment, the corner pieces 240 define generally right-angle corners for joining a side rail 210 to an end rail 220. The corner pieces 240 and rails 210, 220 can be secured to each other using fasteners, though other fixing means may be contemplated. They may also be only slide fit. The corner pieces 240 may include a coupling portion 241 adapted to connect with components of the trellis netting support assembly (if present). Having such corner pieces 240 may contribute to modularity and facilitate assembly. However, side rails 210 and end rails 220 can be connected together in other ways. As shown, the corner pieces 240 may have a coupling portion 241 extending upwardly relative to the bench 10 to support respective trellis bars. This will be discussed later. Such coupling portions 241 can be configured in other ways or may be absent.

The platform 200 may include side clamps 250 which may be mounted on the side rails 210 and/or end rails 220. The side clamps 250 may be adapted to connect with components of the trellis netting support assembly, as discussed above with respect to the corner pieces 240. The side clamps 250 may be fastened or otherwise secured to the side rails 210 or end rails 220. The side clamps 250 may also interact with the side rail segments 210A, 210B of the extendable bench sections 10A and adjacent bench section 10B of the side rails 210. As shown, during assembly, the side rail segments 210A, 210B may slide relative to each other along axis X-X to adjust the length of the bench 10. Once the desired length is set, the side clamps 250 may be secured at a location on the side rail where the side rail segments 210A, 210B overlap. The side clamps 250 may thus block further relative movement of the side rail segments 210A, 210B. This is only one possibility to block the relative movement of the side rails segments 210A, 210B, as other locking mechanisms may be contemplated using side clamps 250, or otherwise.

Figure 6:
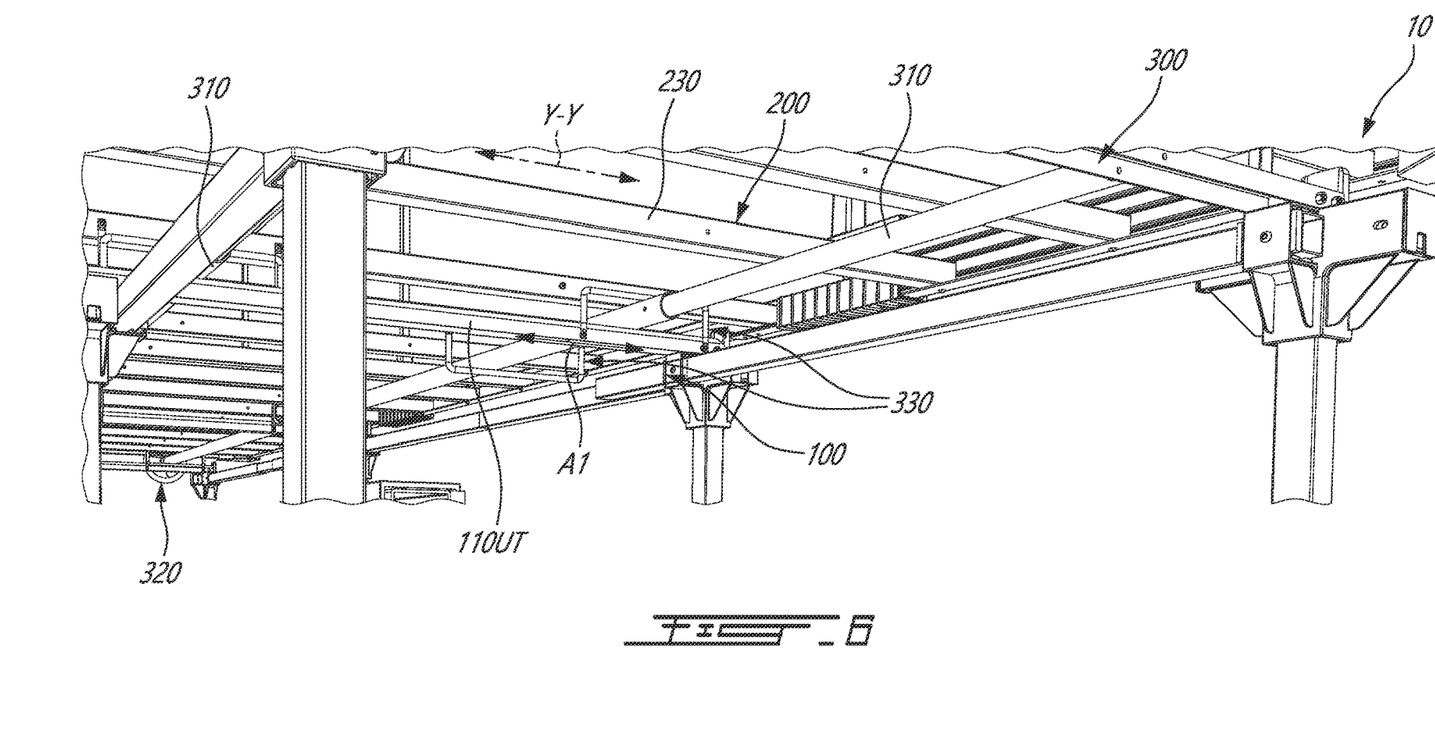
FIG. 6 is another perspective view of the section shown in FIG. 5 of the harvesting bench, viewed from below.

Referring to FIG. 6, the rolling system 300 is presented. The rolling system 300 includes components that interface with the frame 100 and the platform 200. The rolling system 300 allows for the platform 200 to move laterally relative to the frame 100. In the depicted embodiment, the rolling system 300 includes at least two bars 310, which are round bars herein and hollowed tubes to reduce weight, extending along the bench 10. In order to allow extension of the bench section 10A relative to the adjacent bench section 10B, the bars 310 are telescopic (similar to that discussed above with respect to armature members). When the bench 10 extends or retract via movement of the bench section 10A, the bars 310 correspondingly extend or retract to accommodate the extension or retraction of the bench 10. There may be more than two bars 310 (e.g. three, four . . . ). The rolling system 300 includes at least one actuator 320 at one end of the bench 10. The actuator 320 may allow lateral displacement of the platform 200 relative to the frame 100 along axis Y-Y. In the depicted embodiment, the actuator 320 is connected to an end of one of the bars 310. In the depicted embodiment, the actuator 320 is a wheel connected at an end of the a respective one of the bars 310. The actuator 320 is manually actuatable to cause rotation of the bars 310 against portions of the frame 100 and the platform 200, which may be directly against the armature cross-members 110UT and the cross-members 230 of the platform 200. The rolling engagement/movement of the bars 310 against the armature cross-members 110UT and the cross-members 230 of the platform 200 may induce a transverse movement of the platform 200 relative to the frame 100, as illustrated by the arrow A1 in FIG. 6. Lateral displacement of the platform 200 with respect to the frame 100 may also be contemplated without the actuator 320.

In the depicted embodiment, the rolling system 300 may interconnect the platform 200 and the frame 100 such that the platform 200 may not be removed from the frame 100. The rolling system 300 includes arches 330 (or "hoops") connected on one and/or the other of the frame 100 and the platform 200. As shown, the arches 330 are bent rod in the form of an arch, with the ends of the arches connected to one of the upper armature cross-members 110UT and/or one of the cross-members 230 of the platform 200. The arches 330 may be connected thereto in various ways, including via fasteners. The bars 310 are displaceable relative to the arches 300 when the bars 310 rolls over a limited distance along the upper armature cross-members 110UT. As shown, the bars 310 are interlaced with a pair of arches 330. The bars 310 extend between a first arch 330 and the cross-member 230 of the platform 200 on which such arch 330 is attached. The bars extend between a second arch 330 adjacent the first arch 330 and the upper armature cross-member 110UT on which the second arch 330 is attached, such that the bar 330 interface between the two arches 330 and is limited to roll over a distance no longer than a distance between ends of the arches 300 (or smallest arches if one is smaller than the other). As such, when the bars 310 reach the limit distance, the arches 330 via shearing against the bars 310 may prevent further movement of the platform 200 relative to the frame 100 in the transversal direction of the bench 10.

As shown, as one pair of arches 330 "encage" laterally the bars 310 and are secured respectively to the platform 200 and the frame 100, the platform 200 may be retained on the frame 100 through the bars 310 encaged to their respective pairs of arches 330. Other mechanisms allowing retention of the platform 200 on the frame 100 while allowing lateral movement of the platform 200 relative to the frame 100 may be contemplated. There may be more or less arches 330 in other embodiments.

In some embodiments, as shown, the bars 310 are the sole interface between platform 200 and frame 100, such that the platform 200 may rest on the bars 310 and have no other contact point that connects to the frame 100. In some cases, the bench 10 may not have a rolling system 300, though such system 300 may allow for greater flexibility in use and better space management in harvesting facilities.

Figures 7, 8:
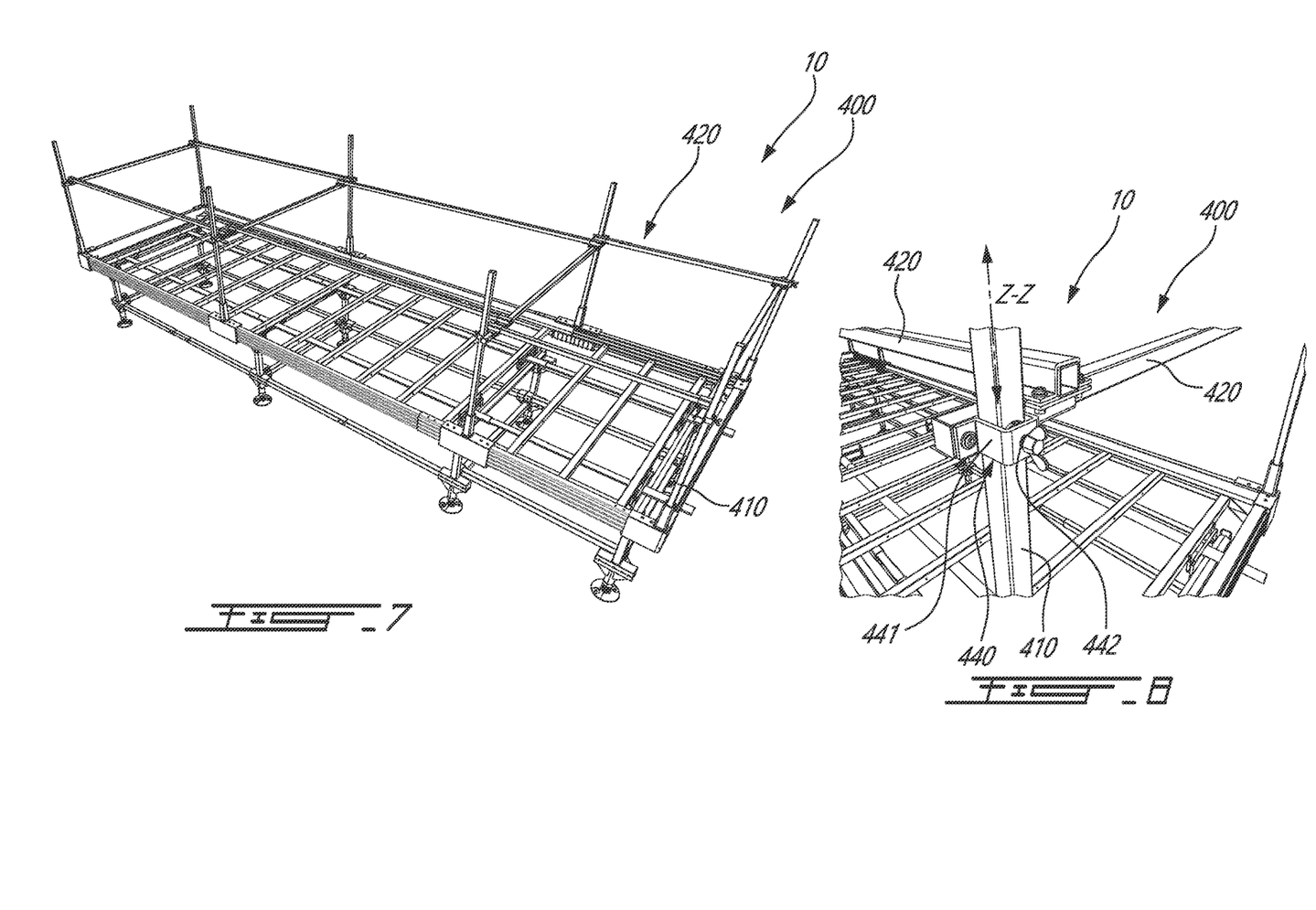
FIG. 7 is another perspective view of the harvesting bench of FIGS. 1-6, viewed from above and showing a trellis support netting assembly.
FIG. 8 is a magnified perspective view of features of the trellis support netting assembly of FIG. 7.

Referring to FIGS. 7-8 The trellis netting support assembly 400 (or simply "trellis assembly 400") includes upwardly extending bars 410, which may be substantially vertical. The upwardly extending bars 410 are secured, or simply engaged with corner pieces 240 or side clamps 250. The trellis assembly 400 includes a network of horizontal bars 420 supported by the upwardly extending bars 410. The network of horizontal bars 420 may be interconnected via suitable connectors, such as brackets 430. In some embodiments, the network of horizontal bars 420 may be formed as a single piece, for instance as a welded assembly.

In the depicted embodiment, the network horizontal bars 420 may be adjustable in height along axis Z-Z. As shown, the network of horizontal bars 420 are connected to the upwardly extending bars 410 via slidable connectors 440. The slidable connectors 440 include a bracket 441 and an actuator 442 movable between a release position and a secured position. In the release position, the actuator 442 allows height adjustment of network horizontal bars 420. In the secured position, the actuator 442 may prevent relative movement of the network horizontal bars 420 and the upwardly extending bar 410 on which said connector 440 is mounted (or at least components of the network horizontal bars 420 attached to that upwardly extending bar 410 via said connector 440). In the depicted embodiment, the actuator 442 may be actuated manually to allow hand adjustment of the height. In the depicted embodiment, the actuator 442 is a clamp, here a screw clamp, though other actuators could be contemplated, such as actuators with a manually operable lever, for instance.

Vertical and horizontal monikers should not be interpreted restrictively as being perfectly vertical or horizontal, but simply as a general orientation within a normal use environment.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, the frame 100 may be a partially wired frame. An arrangement of wires may be connected to adjacent connectors 120 instead of or in addition to at least some of the armature members extending longitudinally and/or transversely relative to the bench 10. Depending on the geometry of the frame 100, for instance, if the legs are not substantially vertical but instead oblique (slightly or substantially), such wires may be under tension if suitably placed and/or connected between a pair of connectors 120, hence they may contribute to the structural integrity of the frame 100, which may limit weight of the frame 100 when compared to some embodiments not having such wired frame configuration.

As another example, other frame 100 geometry may be contemplated, for instance with more than one extendable bench section 10A with a different number of armature members, adapted to extend or retract relative to a remainder of the bench 10 and/or adjacent sections 10B thereof to adjust the footprint FP (longitudinal and/or transversal) of the bench 10.

Yet further modifications could be implemented by a person of ordinary skill in the art in view of the present disclosure, which modifications would be within the scope of the present technology.

The invention claimed is:

1. A harvesting bench configured to stand on a ground surface, comprising:
   a frame for contacting the ground surface,
   a platform supported by the frame at an elevation above the ground surface, the platform defining a work plane area for receiving harvesting equipment,
   a portion of the frame and a portion of the platform defining parts of a first bench section movable relative to a second bench section between a retracted position and an extended position to extend or retract a footprint of the harvesting bench and/or extend or reduce the work plane area, wherein the first bench section includes a first plurality of armature connectors and a first plurality of armature members connected to respective ones of the first plurality of armature connectors, the first plurality of armature members elongated in a direction extending along a longitudinal axis of the harvesting bench, wherein the second bench section includes a second plurality of armature connectors each having a coupling portion, the first plurality of armature members engaged to the coupling portions of at least some of the second plurality of armature connectors, wherein the platform includes peripheral rails, wherein some of the peripheral rails are part of the first bench section and include side rail segments extending along the longitudinal axis, the side rail segments engaged to corresponding side rails segments part of the second bench section, the side rail segments of the first bench section movable relative to their respective corresponding side rail segments of the second bench section so as to retract or extend the work plane area when the first bench section moves between the retracted position and the extended position.

2. The harvesting bench as defined in claim 1, wherein the coupling portions have an annular wall defining a through hole having openings at opposite ends of the coupling portions, the first plurality of armature members movable therethrough.

3. The harvesting bench as defined in claim 2, wherein the through hole has a hole orientation parallel to the longitudinal axis of the harvesting bench.

4. The harvesting bench as defined in claim 2, wherein the through hole has a cross-sectional shape corresponding to that of an outer periphery of the first plurality of armature members.

5. The harvesting bench as defined in claim 1, wherein the second bench section includes a second plurality of armature members secured to the second plurality of armature connectors, wherein at least some of the second plurality of armature members extend along the longitudinal axis and are secured at their respective ends to respective ones of the second plurality of armature connectors.

6. The harvesting bench as defined in claim 5, wherein the second plurality of armature connectors each include a pair of side coupling portions coaxial one with respect to the other, the at least some of the second plurality of armature members connected to a respective one of the side coupling portions of adjacent ones of the second plurality of armature connectors.

7. The harvesting bench as defined in claim 6, wherein at least some of the second plurality of armature connectors each include a head coupling portion coplanar with and perpendicular to the pair of side coupling portions.

8. The harvesting bench as defined in claim 7, wherein the at least some of the second plurality of armature connectors each include a transverse coupling portion perpendicular to the head coupling portion and to the pair of side coupling portions.

9. The harvesting bench as defined in claim 7, wherein the head coupling portion and/or the pair of side coupling portions are female couplings receiving therein respective ends of the second plurality of armature members.

10. The harvesting bench as defined in claim 5, wherein at least some of the second plurality of armature members are extendable longitudinally to vary a distance between adjacent ones of the second plurality of armature connectors.

11. The harvesting bench as defined in claim 5, wherein the first plurality of armature members and the second plurality of armature members are tubes.

12. The harvesting bench as defined in claim 5, further comprising a rolling system operable to displace the platform relative to the frame in a direction transverse to the longitudinal axis, the rolling system having at least two bars extending longitudinally along the longitudinal axis, the at least two bars extendable to correspondingly retract or extend when the first bench section moves between the retracted position and the extended position, the at least two bars in rolling engagement with some of the second plurality of armature members and the platform.

13. The harvesting bench as defined in claim 12, wherein the at least two bars define a sole interface between the platform and the frame.

14. The harvesting bench as defined in claim 1, wherein the first plurality of armature connectors move toward and away from the second plurality of armature connectors when the first bench section moves between the retracted position and the extended position relative to the second bench section.

15. The harvesting bench as defined in claim 1, wherein the first plurality of armature members extend through the coupling portions of the second plurality of armature connectors, the first plurality of armature members movable relative to the coupling portions in the direction extending along the longitudinal axis when the first bench section moves between the retracted position and the extended position relative to the second bench section.

16. The harvesting bench as defined in claim 1, wherein the first plurality of armature connectors each include a coupling portion, the first plurality of armature members removably secured to the coupling portions of the first plurality of armature connectors and of the second plurality of armature connectors to fix the first bench section in the retracted position or the extended position relative to the second bench section.

17. The harvesting bench as defined in claim 16, wherein all of the coupling portions of the first plurality of armature connectors are as that of the second plurality of armature connectors.

18. The harvesting bench as defined in claim 1, wherein a first set of the first plurality of armature connectors and of the second plurality of armature connectors include a respective foot portion for contacting the ground surface, and a second set of the first plurality of armature connectors and of the second plurality of armature connectors are located at an elevation above the ground surface, between the first set of the first and second plurality of armature connectors and the platform.

19. A harvesting bench configured to stand on a ground surface, comprising:
   a frame for contacting the ground surface,
   a platform supported by the frame at an elevation above the ground surface, the platform defining a work plane area for receiving harvesting equipment,
   a portion of the frame and a portion of the platform defining parts of a first bench section movable relative to a second bench section between a retracted position and an extended position to extend or retract a footprint of the harvesting bench and/or extend or reduce the work plane area,
   wherein the first bench section includes a first plurality of armature connectors and a first plurality of armature members connected to respective ones of the first plurality of armature connectors, the first plurality of armature members elongated in a direction extending along a longitudinal axis of the harvesting bench, wherein the second bench section includes a second plurality of armature connectors each having a coupling portion, the first plurality of armature members engaged to the coupling portions of at least some of the second plurality of armature connectors, wherein the second bench section includes a second plurality of armature members secured to the second plurality of armature connectors, wherein at least some of the second plurality of armature members extend along the longitudinal axis and are secured at their respective ends to respective ones of the second plurality of armature connectors.

20. The harvesting bench as defined in claim 19, wherein the second plurality of armature connectors each include a pair of side coupling portions coaxial one with respect to the other, the at least some of the second plurality of armature members connected to a respective one of the side coupling portions of adjacent ones of the second plurality of armature connectors.

\* \* \* \* \*